United States Patent [19]

Goralski et al.

[11] 4,041,073
[45] Aug. 9, 1977

[54] 3,4,5-TRICHLORO-N,N-di(LOWERALKYL)-2-(MERCAPTO) BENZENESULFONAMIDES

[75] Inventors: Christian T. Goralski; R. Garth Pews, both of Midland; George A. Burk, Bay City, all of Mich.

[73] Assignee: The Dow Chemical Company, Midland, Mich.

[21] Appl. No.: 730,034

[22] Filed: Oct. 6, 1976

Related U.S. Application Data

[62] Division of Ser. No. 645,060, Dec. 29, 1975.

[51] Int. Cl.² .......................................... C07C 143/78
[52] U.S. Cl. .......................... 260/556 AR; 260/455 A
[58] Field of Search ................................ 260/556 AR

[56] References Cited

U.S. PATENT DOCUMENTS

| 3,574,739 | 4/1971 | Wei et al. | 260/556 AR |
| 3,828,078 | 8/1974 | Mrozik | 260/556 AR X |
| 3,828,079 | 8/1974 | Mrozik | 260/556 AR X |
| 3,829,487 | 8/1974 | Mrozik | 260/556 AR |
| 3,953,492 | 4/1976 | Mrozik | 260/556 AR X |
| 3,953,493 | 4/1976 | Vanden Heuvel | 260/556 AR X |
| 3,987,199 | 10/1976 | Mrozik | 260/556 AR X |
| 3,997,603 | 12/1976 | Martin | 260/556 AR |

*Primary Examiner*—Daniel E. Wyman
*Assistant Examiner*—Thomas A. Waltz
*Attorney, Agent, or Firm*—S. Preston Jones; C. Kenneth Bjork

[57] ABSTRACT

Compounds are prepared corresponding to the formula

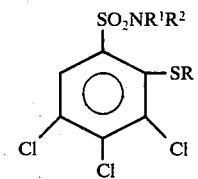

wherein R represents hydrogen or methylenethiocyanate (—CH$_2$SCN) and each of R$^1$ and R$^2$ represents loweralkyl of 1 to 4 carbon atoms. Those compounds wherein R is methylenethiocyanate have been found to be active antimicrobial agents and those wherein R is hydrogen are useful as intermediates therefor.

3 Claims, No Drawings

3,4,5-TRICHLORO-N,N-DI(LOWERALKYL)-2-(MERCAPTO) BENZENESULFONAMIDES

This is a division of application Ser. No. 645,060, filed Dec. 29, 1975.

SUMMARY OF THE INVENTION

The present invention is directed to compounds corresponding to the formula

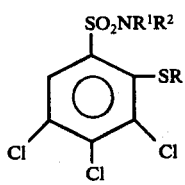

In this and succeeding formulae, R represents hydrogen or methylenethiocyanate (—CH$_2$SCN) and each of R$^1$ and R$^2$ represents loweralkyl of 1 to 4 carbon atoms. Those compounds wherein R is methylenethiocyanate have been found to be active antimicrobial agents useful for the control of fungal and bacterial organisms such as, for example, bean mildew, *Staphylococcus aureus*, *Candida albicans*, *Trichophton mentagrophytes*, *Bacillus subtilis*, *Aspergillus terreus*, *Pullularia pullulans*, *Mycobacterium phlei* and *Rhizopus nigricans*. Those compounds wherein R is hydrogen have utility as intermediates for the preparation of the active antimicrobial agents of the present invention.

The compounds of the present invention are crystalline solids which are insoluble in water and are soluble in many organic solvents.

The term "loweralkyl" as employed in the present specification and claims designates saturated, monovalent aliphatic radicals, including straight and lateral chain radicals such as, for example, methyl, ethyl, n-propyl, isopropyl, n-butyl and secondary butyl.

The compounds of the present invention wherein R is hydrogen can be prepared by a variety of processes. In one such procedure a 2-hydroxy-3,4,5-trichlorobenzene-sulfonamide is reacted in a base such as aqueous sodium or potassium hydroxide with an equimolar amount of an appropriate N,N-di(loweralkyl) thiocarbamoyl chloride. The 2-N,N-di(loweralkyl)thiocarbamoyl chloride. The 2N,N-di(loweralkyl)thiocarbamoyl-3,4,5-trichlorobenzen-sulfonamide product is thereafter heated to rearrange the O C (S) N (loweralkyl)$_2$group to its S C (O)N(loweralkyl)$_2$ counterpart. The rearranged material is thereafter mixed with a lower alkanol and sodium or potassium hydroxide and refluxed for about 4 hours and then acidified with a mineral acid such as concentrated hydrochloric acid. The product is crystallized from hexane and dried.

This above procedure can be exemplified as follows:

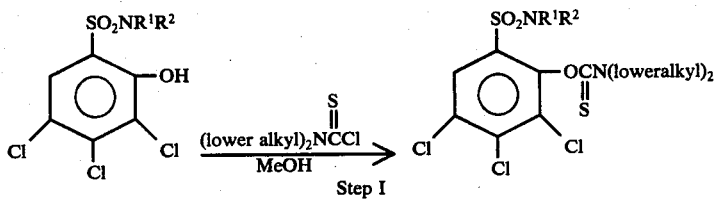
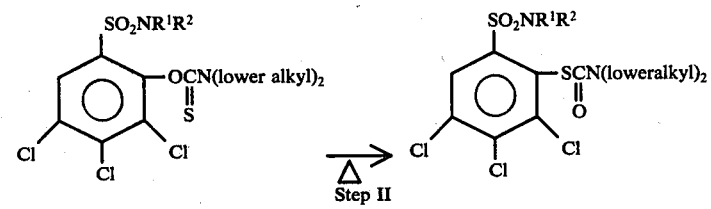
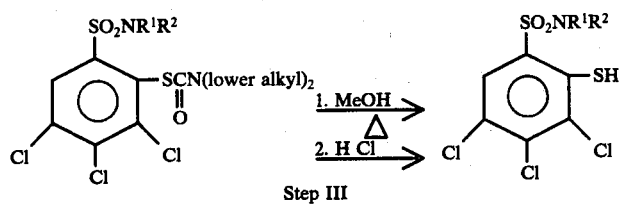

wherein R$^1$ and R$^2$ are as hereinbefore defined and Me is sodium or potassium.

In An alternative procedure, those compounds wherein R is hydrogen can be prepared by the reaction under reflux conditions of one molecular equivalent of a 2,3,4,5-tetrachloro-N,N-di(loweralkyl)benzenesulfonamide with about 2 to 3 molecular equivalents of sodium sulfide under reflux conditions in the presence of loweralkanol. After the reaction is complete, the reaction mixture is cooled and the sodium chloride by-product removed by filtration. The resulting product mixture is water washed to remove water insoluble material, filtered and the filtrate acidified with concentrated hydrochloric acid. The crude product precipitates and is recovered by filtration and dried and if desired, the product can be purified by recrystallization from a solvent such as pentane, hexane, heptane, or other similar hydrocarbon solvents.

This above procedure an be exemplified as follows:

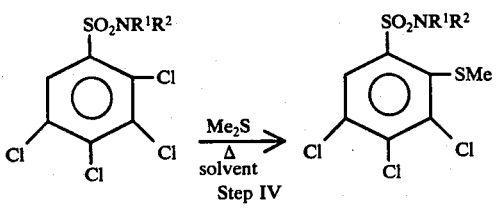

-continued

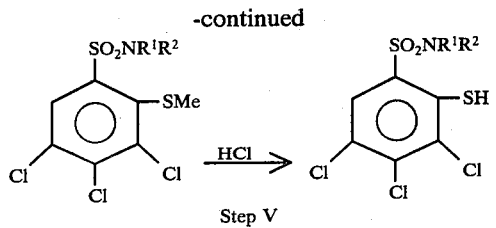

Step V wherein R¹ and R² are as hereinbefore set forth and Me is sodium or potassium.

The compounds of the present invention wherein R is methylenethiocyanate (—CH₂—SCN) can be prepared by the reaction of a 3,4,5-trichloro-2-(alkalimetal mercapto) or (mercapto) N,N'-di(loweralkyl)benzenesulfonamide and chloromethylthiocyanate in the presence of a reaction medium such as methanol, ethanol, dimethylformamide or dimethylsulfoxide.

In carrying out this procedure, one molecular equivalent of the 3,4,5-trichloro-2-(mercapto)substituted N,N-di(loweralkyl)benzenesulfonamide (if the alkali salt is not available) in the solvent is mixed with about 1.1 molecular equivalents of an alkali methoxide. To this mixture is added about 1.1 molecular equivalents of chloromethylthiocyanate and the resulting mixture is stirred at a temperature of from about room temperature up to the reflux temperature of the mixture for about 0.5 to about 2 hours. If the starting benzenesulfonamide already contains an alkali mercapto group, this material can be mixed with the solvent and reacted directly with the chloromethylthiocyanate as set forth above. After the reaction is complete, the reaction mixture is filtered to remove any insolubles and the solvent removed by evaporation under reduced pressure. The product can by recovered as such or if desired, it can be crystallized from a solvent such as chloroform or hexane or mixtures thereof.

These above procedures can be exemplified as follows:

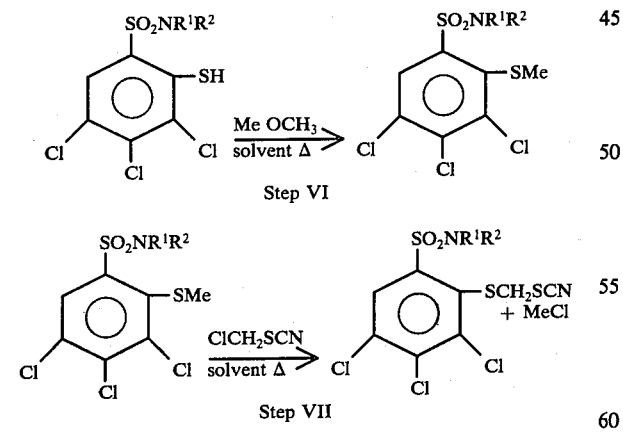

Step VI

Step VII wherein R¹, R² and Me are as hereinbefore set forth.

DESCRIPTION OF SOME PREFERRED EMBODIMENTS

The following examples serve to illustrate the practice of the present invention but are not intended to be limitations upon the overall scope of the same.

EXAMPLE I 3,4,5-Trichloro-N,N-diethyl 2-(mercapto)benzenesulfonamide

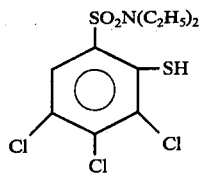

To a mixture of 50 grams (0.15 mole) of 2,3,4,5-tetrachloro-N,N-diethylbenzenesulfonamide in 400 milliliters of methanol at reflux was added over a period of ½ hour, a solution of 100 grams (0.42 mole) of sodium sulfide-nonahydrate (Na₂S-9H₂O) in 400 milliliters of methanol. After the addition was complete, the mixture was refluxed for 3 hours. At the completion of this reaction, the mixture was allowed to cool and the sodium chloride which precipitated, was removed by filtration. The filtrate was diluted with 1 liter of water and the water insoluble materials were removed by filtration. The filtrate was thereafter acidified with concentrated hydrochloric acid and the crude product, a pale yellow solid precipitated out. The product was recovered by filtration, dried and recrystallized from hexane. The 3,4,5-trichloro-N,N-diethyl-2-(mercapto)-benzenesulfonamide product was recovered in a yield of 46.0 grams (100 percent of theoretical) and melted at 96°–99° C.

By following the procedure of Example 1, the following compounds are made.

3,4,5-Trichloro-N,N-dimethyl-2-(mercapto) benzenesulfonamide, having a molecular weight of 320.65;
3,4,5-trichloro-N,N-di-n-propyl-2-(mercapto)benzenesulfonamide, having a molecular weight of 376.75;
3,4,5-trichloro-N,N-di-n-butyl-2-(mercapto)benzenesulfonamide, having a molecular weight of 404.81.

EXAMPLE II 3,4,5-Trichloro-N,N-dimethyl-2-(thiocyano-methyl)thio)benzenesulfonamide

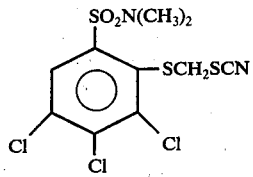

To a stirring mixture of 1.5 grams (0.0047 mole) of 3,4,5-trichloro-N,N-dimethyl-2-(mercapto)benzene-sulfonamide in 80 milliliters of methanol at 25° C, was added 0.39 grams of sodium methoxide. The mixture was stirred for 15 minutes and thereafter 1.0 gram (0.009 mole) of chloromethylthiocyanate was added thereto and the mixture stirred at room temperature for 3 hours. At the end of this time period, the reaction mixture was filtered to remove the solids which had precipitated. The filtrate further heated at 62° C for 2 hours and after cooling, the solvent was reduced in volume by evaporation under reduced pressure. The solids were thereafter removed by filtration. Additional filtrations gave additional solids. The recovered solids were combined and dissolved in chloroform and filtered. The solvent was removed by evaporation under reduced pressure and the solid product which remained was air dried. The 3,4,5-trichloro-N,N-dimethyl-2-(thiocyanomethyl)thio)benzene-sulfonamide product was recovered in a yield of 0.7 grams (40 percent of theoretical) and melted at 155°–156° C.

EXAMPLE III 3,4,5-Trichloro-N,N-diethyl-2-((thiocyanomethyl)-thio) benzenesulfonamide

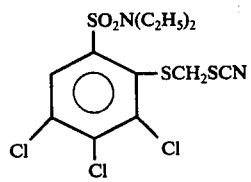

To a mixture of 17.4 grams (0.05 mole) of 3,4,5-trichloro-N,N-diethyl-2-(mercapto)benzenesulfonamide in 150 milliliters of 2B ethanol was added 3.0 grams (0.055 mole) of sodium methoxide. To this solution was added 6.0 grams (0.055 mole) of chloromethyl/thiocyanate and the reaction mixture heated at reflux for 1 hour. The reaction mixture was filtered, and the ethanol removed by evaporation under reduced pressure. The crude product was recovered as a thick oil and was crystallized from a chloroform/hexane mixture. The 3,4,5-trichloro-N,N-diethyl-2-diethyl-2(thiocyanomethyl)thio)benzenesulfonamide product, a white solid, was recovered in a yield of 15.8 grams (70 percent of theoretical) and melted at 83°–85° C.

By following the procedures of Examples II or III, the following compounds are prepared.

3,4,5-Trichloro-N,N-di-n-propyl-2-((thiocyanomethyl)thio)benzenesulfonamide, having a molecular weight of 447.85 and 3,4,5-trichloro-N,N-di-n-butyl-6-((thio-cyanomethyl)thio)benzenesulfonamide, having a molecular weight of 475.90.

In accordance with the present invention, it has been discovered that the 3,4,5-trichloro-N,N-di(lower-alkyl)-2 ((thiocyanomethyl)thio)benzenesulfonamides can be employed for the control of many bacterial and fungal organisms. The compound can be applied to the aerial portions of many growing plants to control leaf-attacking fungal organisms or dispersed in soil or applied to plant seeds to control the root and seed attacking organisms of mold and damping off. In still other operations, the compound can be applied to orchard floor surfaces to control over-wintering spores of many fungal organisms. In still further operations, the compound of the invention or compositons containing the compound as the toxic constituent can be included in and on plaster, ink, wallboard, textiles, paper, adhesives, soaps, synthetic detergents, cutting oils, polymeric materials, embalming fluids, oil paints and latex paints to prevent the attack of various fungal organisms and the subsequent economic loss due to the degradation of such products by microorganisms. Also, the compound can be distributed in textiles, cellulosic materials or in grain or can be employed in the impregnation of wood and lumber to preserve and protect such products from the attack of the organisms of rot, mold and decay.

The exact concentration of the toxicant compound to be employed in the treating compositions is not critical and may vary considerably provided the required dosage of the effective agent is supplied in the ink, adhesive, soap, cutting oil, polymeric material, paint, textile, paper, wood or growth medium or upon plant foliage. The required dosage of the compound to be employed in the kill and control of bacteria and fungal organisms is in the amount of from about 10 or less to about 5000 or more parts by weight of the active compound per million parts by weight of the ultimate treating compositions. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicant can be present in a concentration of from 5 to 98 percent by weight. For use as a foliar spray or in seed treatment, it is often convenient to apply the compound as a wettable powder.

In a representative operation, 3,4,5-trichloro-N,N-dimethyl-2-((thiocyanomethyl)thio)benzenesulfonamide was found to give 100 percent kill and control of the organisms Trichophton mentagrophytes, Aspergillus terreus and ceratocystis IPS, when employed, as the sole toxicant, in a nutrient agar at a concentration of 100 parts by weight of the compound per million parts of the agar.

In another such operation, 3,4,5-trichloro-N,N-diethyl--((thiocyanomethyl)thio)benzenesulfonamide was found to give 100 percent kill and control of the organisms Psueudomonas aeruginosa, Staphylococcus aureus, Candida albicans, Trichophton mentagrophytes, Bacillus subtilis, Aspergillus terreus, Candida pelliculosa, Pullularia pullulans, Mycobacterium phlei, Rhizopus nigricans, Ceratocystis IPS, Cephaloascus fragans and Trichoderm sp. Madison P-42, when employed, as the sole toxicant, in a nutrient agar at a concentration of 100 parts by weight of the compound per million parts of the agar.

In another representative operation, 3,4,5-trichloro-N,N-dimethyl-2-((thiocyanomethyl)thio)benzenesulfonamide and 3,4,5-trichloro-N,N-diethyl-2-((thiocyanomethyl)thio)-benzenesulfonamide each gave at least 50 percent kill and control of the causative organism for downy mildew when applied, as the sole toxicant, to plants affected by said organisms, in an aqueous dispersion, at a concentration of 100 parts by weight of the compound per million parts of the ultimate dispersion.

In another such operation, 3,4,5-trichloro-N,N-diethyl-2-((thiocyanomethyl)thio)benzenesulfonamide was found to give 100 percent kill and control of the causative organism for bean mildew when applied, as the sole toxicant, to plants affected by said organism, in an aqueous dispersion, at a concentration of 100 parts by weight of the compound per million parts of te ultimate dispersion.

What is claimed is:
1. A compound corresponding to the formula

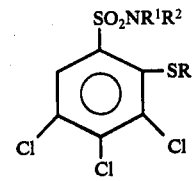

wherein R represents hydrogen; and each of $R^1$ and $R^2$ represents loweralkyl of 1 to 4 carbon atoms.

2. The compound as defined in claim 1 which is 3,4,5-trichloro-N,N-diethyl-2-(mercapto)benzenesulfonamide.

3. The compound as defined in claim 1 which is 3,4,5-trichloro-N,N-diethyl-2-(mercapto)benzenesulfonamide.

* * * * *

UNITED STATES PATENT AND TRADEMARK OFFICE
CERTIFICATE OF CORRECTION

PATENT NO. : 4,041,073

DATED : August 9, 1977

INVENTOR(S) : Christian T. Goralski et al.

It is certified that error appears in the above-identified patent and that said Letters Patent are hereby corrected as shown below:

Column 2, line 4, "oyl chloride. The 2N,N-di(lower-alkyl)thiocarbamoyl-" should read -- oyl- --.

Column 2, line 5, "3,4,5-trichlorobenzen-sulfonamide" should read -- 3,4,5-trichlorobenzene-sulfonamide --.

Column 2, line 59, "procedure an" should read -- procedure can --.

Column 3, line 38, "can by" should read -- can be --.

Column 4, line 43, first line of EXAMPLE II title, "3,4,5-Trichloro-N,N-dimethyl-2(thiocyano-methyl)thi-" should read
-- 3,4,5-Trichloro-N,N-dimethyl-2((thiocyano-methyl)thi- --.

Column 5, line 3, "3,4,5-trichloro-N,N-dimethyl-2-(thio-" etc. should read -- 3,4,5-trichloro-N,N-dimethyl-2-((thio- etc. --.

Column 5, line 29, "3,4,5-trichloro-N,N-diethyl-2--diethyl-2(thiocyanome-" should read
-- 3,4,5-trichloro-N,N-diethyl-2-((thiocyanome- --.

Column 5, line 41, "2 ((thiocyanomethyl)thio)" etc. should read -- 2-((thiocyanomethyl)thio) etc. --.

Column 5, line 50, "compositons" should read -- compositions --.

UNITED STATES PATENT AND TRADEMARK OFFICE
CERTIFICATE OF CORRECTION

PATENT NO. : 4,041,073

DATED : August 9, 1977

INVENTOR(S) : Christian T. Goralski et al.

It is certified that error appears in the above-identified patent and that said Letters Patent are hereby corrected as shown below:

Column 6, line 23, "yl--((thiocyanomethyl)thio)" etc. should read -- yl-2-((thiocyanomethyl)thio) etc. --.

Column 6, line 48, "te ultimate" should read -- the ultimate --.

Column 6, line 63, "trichloro-N,N-diethyl-2-" etc. should read -- trichloro-N,N-dimethyl-2- etc. --.

Signed and Sealed this

Fourteenth Day of February 1978

[SEAL]

Attest:

RUTH C. MASON
Attesting Officer

LUTRELLE F. PARKER
Acting Commissioner of Patents and Trademarks